United States Patent
Guillon et al.

(10) Patent No.: US 10,241,327 B2
(45) Date of Patent: Mar. 26, 2019

(54) OPTICAL SYSTEM COMPRISING A SPATIAL LIGHT MODULATOR

(71) Applicants: CENTRE NATIONAL DE LA RECHERCHE SCIENTIFIQUE (CNRS), Paris (FR); UNIVERSITE PARIS DESCARTES, Paris (FR); INSTITUT NATIONAL DE LA SANTE ET DE LA RECHERCHE MEDICALE (INSERM), Paris (FR)

(72) Inventors: Marc Guillon, Versailles (FR); Eirini Papagiakoumou, Antony (FR); Valentina Emiliani, Paris (FR)

(*) Notice: Subject to any disclaimer, the term of this patent is extended or adjusted under 35 U.S.C. 154(b) by 10 days.

(21) Appl. No.: 15/121,139

(22) PCT Filed: Feb. 24, 2015

(86) PCT No.: PCT/EP2015/053855
§ 371 (c)(1),
(2) Date: Aug. 24, 2016

(87) PCT Pub. No.: WO2015/124801
PCT Pub. Date: Aug. 27, 2015

(65) Prior Publication Data
US 2017/0017076 A1 Jan. 19, 2017

(30) Foreign Application Priority Data
Feb. 24, 2014 (EP) .................... 14305253

(51) Int. Cl.
*G02B 27/00* (2006.01)
*G02B 21/16* (2006.01)
(Continued)

(52) U.S. Cl.
CPC ......... *G02B 27/0068* (2013.01); *G02B 21/14* (2013.01); *G02B 21/16* (2013.01);
(Continued)

(58) Field of Classification Search
CPC ...... G02B 21/14; G02B 21/16; G02B 21/365; G02B 26/00; G02B 27/0025;
(Continued)

(56) References Cited

U.S. PATENT DOCUMENTS 7,145,710 B2 * 12/2006 Holmes ............... G02B 5/32
219/121.73
8,115,992 B2 * 2/2012 Brueck ............... G02B 21/365
359/368

(Continued)

FOREIGN PATENT DOCUMENTS

| EP | 1630588 A1 | 3/2006 |
| JP | 2014026083 A | 2/2014 |
| WO | WO2012123715 A1 | 9/2012 |

OTHER PUBLICATIONS

International Search Report and Written Opinion for International Patent Application No. PCT/EP2015/053855 filed Feb. 24, 2015.

*Primary Examiner* — Loha Ben
(74) *Attorney, Agent, or Firm* — Steven M. Shape; Dennemeyer & Associates

(57) ABSTRACT

The invention concerns an optical system (10) comprising:
a spatial light modulator (13) comprising an array of controllable elements adapted for generating a modulated light beam (17) by diffracting an incident light beam (12), the modulated light beam (17) comprising a modulated part and an unmodulated "zero order" part, the modulated part carrying an image to be projected into a replay volume (18),
a control unit for applying a control signal to the controllable elements so as to control the modulated light beam (17) generated by the controllable elements,
a perturbing optical element (30) for introducing optical aberrations in the incident light beam (12) and/or the modulated light beam (17) so as to spread the unmodu-
(Continued)

lated "zero order" part of the modulated light beam in the replay volume (18), the perturbing optical element (30) generating distortions in the image to be projected, wherein the control signal comprises an image signal component carrying data representative of the image to be projected and a correction signal component representative of a correction pattern for correcting the distortions generated by the perturbing optical element (30) in the image to be projected.

17 Claims, 10 Drawing Sheets

(51) Int. Cl.
*G03H 1/04* (2006.01)
*G03H 1/22* (2006.01)
*G02B 21/14* (2006.01)
*G02B 21/36* (2006.01)
*G02B 5/18* (2006.01)

(52) U.S. Cl.
CPC ....... *G02B 21/365* (2013.01); *G02B 27/0025* (2013.01); *G03H 1/0486* (2013.01); *G03H 1/2205* (2013.01); *G03H 1/2249* (2013.01); *G03H 1/2294* (2013.01); *G02B 5/18* (2013.01); *G03H 2001/221* (2013.01); *G03H 2001/2218* (2013.01); *G03H 2001/2244* (2013.01); *G03H 2210/12* (2013.01)

(58) Field of Classification Search
CPC .... G02B 27/0068; G02B 5/18; G02B 5/1828; G02B 5/188; G02B 5/1885; G02B 5/189; G02B 21/0024; G02B 21/0025; G02B 21/0076; G02B 21/06; G02B 26/0808; G02B 26/0816; G02B 26/10; G02B 27/14; G02F 1/01; G02F 1/03; G02F 1/29; G02F 1/292; G03H 1/04; G03H 1/0443; G03H 1/0486; G03H 1/06; G03H 1/22; G03H 1/2205; G03H 1/2249; G03H 1/2294; G03H 2001/0447; G03H 2001/221; G03H 2001/2218; G03H 2001/2244; G03H 2210/12
USPC ..... 359/21, 30, 32, 237, 238, 246, 276, 279, 359/290, 291; 250/557; 356/401; 353/20; 355/52, 71
See application file for complete search history.

(56) References Cited

U.S. PATENT DOCUMENTS

| | | | |
|---|---|---|---|
| 8,208,186 B2* | 6/2012 | Yasuda | G03H 1/22 359/21 |
| 8,526,105 B2* | 9/2013 | Brueck | G02B 21/365 359/368 |
| 9,239,455 B2* | 1/2016 | Brueck | G02B 21/06 |
| 9,541,374 B2* | 1/2017 | Brueck | G02B 21/0056 |
| 9,696,568 B2* | 7/2017 | Sakuma | G02F 1/113 |
| 9,778,573 B2* | 10/2017 | Tang | G02B 21/06 |
| 2015/0185523 A1* | 7/2015 | Matsumoto | G02F 1/1313 359/238 |
| 2016/0246255 A1* | 8/2016 | Brooker | G03H 1/06 |
| 2017/0371248 A1* | 12/2017 | Tang | G02B 21/06 |

* cited by examiner

State of the art

State of the art

State of the art

OPTICAL SYSTEM COMPRISING A SPATIAL LIGHT MODULATOR

FIELD OF THE INVENTION

The invention concerns an optical system comprising a spatial light modulator.

BACKGROUND OF THE INVENTION

A spatial light modulator imposes some form of spatially varying modulation on a light beam in order to project two or three-dimensional images. These modulations concern for example the phase and/or the amplitude of the light beam.

A spatial light modulator usually comprises an array of controllable elements adapted for generating a modulated light beam by diffracting an incident light beam. This array of controllable elements forms a pixelated structure.

However, because of the pixelated structure of the spatial light modulator, a small fraction of the incident light beam, usually a couple of percents, finds itself in the inter-pixel space and therefore is never diffracted by the controllable elements. This undiffracted part of the modulated light beam is called "zero-order" part. The "zero-order" part may also originate from other technical limitations such as an imperfect anti-reflection coating of the spatial light modulator and some inter-pixel cross-talk limiting the control over the controllable elements. This undiffracted part of the modulated light beam cannot be suppressed or moved away by the spatial light modulator itself.

Now referring to FIG. 1, an optical system 1 for holographic photo-excitation comprising a spatial light modulator 2 is illustrated. The optical system 1 aims to project an image on a biological sample arranged on a support 3.

The optical system 1 comprises a laser light emitting source 4 generating an incident light beam 5. The spatial light modulator 2 is arranged on the optical path of the incident light beam 5 for diffracting said incident light beam 5 and generating a modulated light beam 6. As explained above, the modulated light beam 6 comprises a modulated part carrying an image and an unmodulated "zero-order" part. The optical system 1 also comprises an objective-lens assembly 7 including a telescope and a microscope objective for projecting the image on the biological sample and exciting said biological sample, as well as an optical arrangement 8 made of optics and detector for observing the excited biological sample on a display.

As shown in FIG. 2, wherein the image to be projected on the sample has been chosen to be the Eiffel tower, the unmodulated "zero-order" part results in a tightly focused spot illuminating the sample that may induce unwanted excitation of the sample and therefore artifacts in the obtained result.

Several researches have been carried out in order to avoid that the unmodulated "zero-order" part illuminates or excites the sample. Such researches are summarized in the document Zhang et al., *Elimination of a zero-order beam introduced by a pixelated spatial light modulator for holographic projection*, Applied Optics, vol. 48, No. 30, 5834 (20 Oct. 2009).

A first technique according to this document is to block the unmodulated "zero-order" light beam in an intermediate plane, so that the modulated part carrying the image is the only one illuminating the biological sample. Blocking the zero-order in an intermediate image is very efficient but introduces a blind-zone at the center of the excitation field. Moreover, it requires a precise alignment of a supplementary optical element which is the beam block. In addition, diffraction efficiency is degraded as the pattern of interest must be moved away (transversely or axially) from the central blind-zone.

A second technique according to this document is to shift away the unmodulated "zero-order" part from the region of interest of the biological sample, so that the region of interest is only illuminated by the modulated part carrying the image. Such a technique is for example illustrated in FIG. 3 wherein the image to be projected on the sample has been chosen to be a disk. As shown in FIG. 3, the unmodulated "zero-order" part has been shifted away from the region of interest of the sample, i.e. the region on which the disk is projected. However, this technique may still induce unwanted excitation of the sample by the unmodulated "zero-order" part and therefore artifacts in the obtained result. This technique may also decrease the diffraction efficiency of the spatial light modulator due to the required modification of the image signal component of the control signal.

The present invention aims to provide a technique for suppressing the artifact due to the unmodulated «zero-order» part of the modulated light beam without inducing a blind zone at the center of the replay volume nor inducing unwanted excitation of the sample.

SUMMARY OF THE INVENTION

The present invention proposes in a first aspect an optical system comprising:

- a spatial light modulator comprising an array of controllable elements adapted for generating a modulated light beam by diffracting an incident light beam, the modulated light beam comprising a modulated part and an unmodulated "zero order" part, the modulated part carrying an image to be projected into a replay volume;
- a control unit for applying a control signal to the controllable elements so as to control the modulated light beam generated by the controllable elements,
- wherein the optical system comprises a perturbing aberrant optical element for introducing optical aberrations in the incident light beam and/or the modulated light beam so as to spread the unmodulated "zero order" part of the modulated light beam in all the replay volume, the perturbing aberrant optical element generating distortions in the image to be projected, the control signal comprises an image signal component carrying data representative of the image to be projected and a correction signal component representative of a correction pattern for correcting the distortions generated by the perturbing optical element in the image to be projected.

The image can be projected anywhere in the replay volume with a change of the perturbing aberrant optical element, without being polluted by the unmodulated "zero order" part.

Preferably, the perturbing aberrant optical element spreads sufficiently the zero-order part of the modulated light beam in the replay volume, so as a maximum intensity of the unmodulated "zero order" part in the replay volume is less than a maximum intensity of the modulated part in the replay volume.

Preferably, for a same power of the unmodulated "zero order" part in the replay volume, the perturbing optical element decreases by a factor five or more, preferably ten or more, a maximum intensity of the unmodulated "zero order" part of the modulated light beam in the replay volume.

More preferably, the modulated part carries an image to be projected into a replay volume for exciting a light sensitive substance located in the replay volume, and for a same power of the unmodulated "zero order" part in the replay volume, the perturbing aberrant optical element decreases by a factor five or more, preferably ten or more, a maximum excitation of the light sensitive substance by the unmodulated "zero order" part of the modulated light beam.

Preferably, the perturbing aberrant optical element is configured for spatially modulating a phase of the incident light beam and/or the modulated light beam.

Preferably, the correction signal component does not contain phase differences larger than 180° applied to adjacent controllable elements.

Preferably, the aberrations introduced by the perturbing optical element have spatial frequencies that are less than or equal to 1/(2a), where a is a period of the array of controllable elements.

According to one embodiment of the invention, the spatial light modulator is a spatial phase modulator. According to another embodiment of the invention, the spatial light modulator is an amplitude modulator.

According to one embodiment of the invention, the perturbing aberrant optical element comprises a lens having a cylindrical surface, for spreading the incident light beam and/or the modulated light beam according to a spreading direction.

According to another embodiment of the invention, the perturbing optical element comprises a first lens having a first cylindrical surface and a second lens having a second cylindrical surface, for spreading the incident light beam and/or the modulated light beam according to a first spreading direction and to a second spreading direction defining an angle relative to the first spreading direction.

According to one embodiment of the invention, the modulated part carries an image to be projected into a replay volume for exciting a light sensitive substance located in the replay volume.

Preferably, the light sensitive substance is a fluorescent material.

Preferably, the light sensitive substance exhibits a non-linear optical response.

More preferably, the excitation of the light sensitive substance is proportional to the square of light intensity.

According to one embodiment of the invention, the optical system further comprises a support for receiving a sample and an objective lens assembly for projecting the image into the sample.

According to one embodiment of the invention, the optical system further comprises a dispersive optical element for pulse stretching the modulated light beam, and an optical arrangement for pulse compressing the stretched modulated light beam in the replay volume.

According to one embodiment of the invention, the optical system further comprises an optical fiber or an optical fiber bundle and wherein the image is projected in the replay volume through the optical fiber or optical fiber bundle.

According to one embodiment of the invention, the optical system further comprises an amplitude modulator arranged between the spatial light modulator and the light sensitive substance, the amplitude light modulator modulating an amplitude of the modulated light beam, preferably increasing a modulation speed.

The invention proposes in a second aspect a method for spreading an unmodulated "zero-order" part of a modulated light beam generated by a spatial light modulator, comprising the steps of:

a) generating an incident light beam;
b) diffracting the incident light beam by means of the spatial light modulator;
c) generating the modulated light beam by applying a control signal to controllable elements of the spatial light modulator, the control signal comprises an image signal component carrying data representative of an image to be projected, the modulated light beam comprising a modulated part and the unmodulated "zero-order" part, the modulated part carrying the image to be projected into a replay volume;
d) before step b) and/or after step c) introducing optical aberrations in the incident light beam and/or the modulated light beam by means of a perturbing aberrant optical element so as to spread the unmodulated "zero-order" part of the modulated light beam in the replay volume; and
e) correcting distortions generated by the perturbing aberrant optical element in the image to be projected by applying to the controllable elements a correction signal component of the control signal representative of a correction pattern.

BRIEF DESCRIPTION OF THE DRAWINGS

The above, and other objects, features and advantages of this invention, will be apparent in the following detailed description which is to be read in connection with the accompanying drawings wherein.

DETAILED DESCRIPTION OF THE INVENTION

Figure 4:
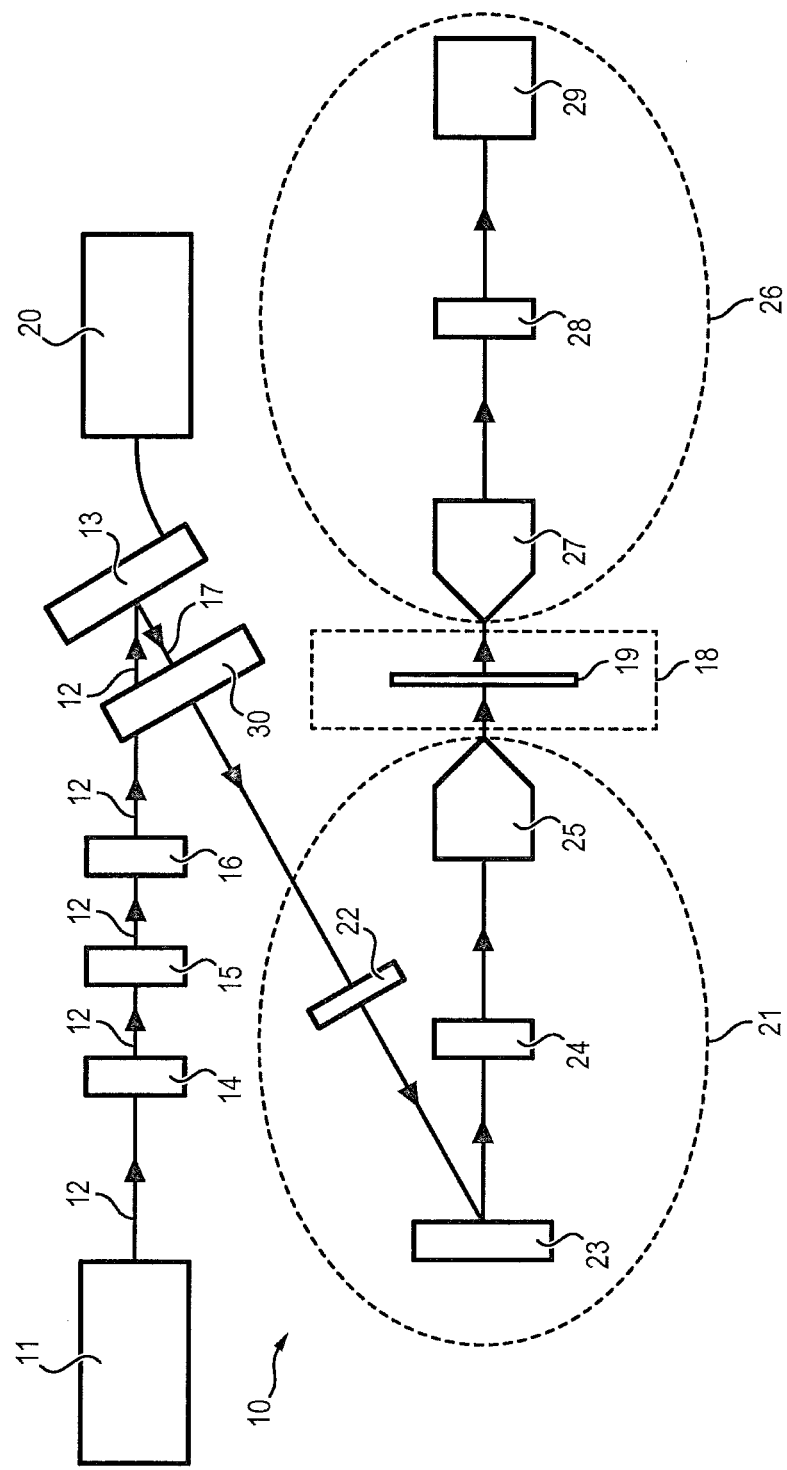
FIG. 4 is a schematic view of an optical system according to one embodiment of the invention.

FIG. 4 shows an optical system 10 according to one embodiment of the invention.

The optical system 10 comprises a laser light emitting source 11 for generating an incident light beam 12 and illuminating a spatial light modulator 13.

As in the example illustrated in FIG. 4, the optical system 10 also comprises a power controller 14, a polarization controller 15 and a beam expander 16 arranged in an optical path of the incident light beam 12. The power controller 14 is configured for adapting the light power to the sample sensitivity. The polarization controller 15 is configured for adapting the polarization of the incident light beam 12 to the requirements of the spatial light modulator 13, if necessary. The beam expander 16 is configured for enlarging the size of the incident light beam 12 so that it illuminates all the spatial light modulator 13.

The spatial light modulator 13 comprises an array of controllable elements adapted for generating a modulated light beam 17 by diffracting the incident light beam 12.

The spatial light modulator 13 can be a spatial phase modulator and/or an amplitude modulator adapted for modulating a phase and/or an amplitude of the incident light beam 17.

The modulated light beam 17 comprises a modulated part carrying a two or three dimensional holographic image to be projected into a replay volume 18. The modulated part of the modulated light beam 17 excites a light sensitive substance located in the replay volume 18.

The replay volume 18 is defined by the volume, in the vicinity of the sample support 19, illuminated by the modulated light beam 17. Hence, it comprises the volume illuminated by the modulated part and the unmodulated "zero order" of the modulated light beam 17. The size of the replay volume depends on the characteristics of the spatial light modulator 13, on the size of controllable elements, on the wavelength λ of the incident light beam 12, on the perturbing aberrant optical elements 30 and on the objective lens assembly 21 placed between the spatial light modulator 13 and the sample support. The typical dimensions ΔX, ΔY and ΔZ of the replay volume are $\Delta X = \Delta Y = \lambda \times f_1 \times f_{obj}/(a \times f_2)$ for dimensions transverse to the optical axis of the lenses and $\Delta Z = \lambda \times f_1 \times f_{obj}/(2 \times NA \times a \times f_2)$ for the dimension along the optical axis, where $f_1$ and $f_2$ are the focal length of lenses 22 and 24, respectively, NA is the numerical aperture of the objective lens 25 and a the typical size of the phase actuators of the spatial light modulator 13. These estimates are approximations valid as long as they remain much smaller than $f_{obj}$. For different geometries, the dimensions of the replay volume can be estimated according to the diffracting angle≈λ/a of the spatial light modulator 13. In particular, the axial dimension may be infinite for particular arrangements of the objective lens assembly 21.

The light sensitive substance is for example a fluorescent material.

Preferably the light sensitive substance exhibits a non-linear response to the excitation of the modulated light beam 17. In this case, the excitation of the light sensitive substance is for instance proportional to the square of an intensity of the modulated light beam 17. For instance, if the light sensitive substance can only be excited for intensities larger than a threshold, then the energy of the zero-order can be sufficiently spread by the aberrant optical element 30 so that the light sensitive substance is only excited by the modulated part of the modulated light beam 17 and not by the unmodulated part. If the excitation of the light sensitive substance is proportional to the square of the intensity of the modulated light beam 17, the unmodulated part of the modulated light beam 17 can be spread by the aberrant optical element 30 so that excitation of the light sensitive substance by the unmodulated part of the modulated light beam 17 is arbitrarily small compared to excitation by the modulated part. Any other non-linear response of the light sensitive substance with the intensity of the modulated light beam 17 can be used to synergistically improve zero-order excitation suppression.

As shown in FIG. 4, the light sensitive substance is arranged on a support 19 located in the replay volume 18.

The modulated light beam 17 also comprises an unmodulated part, so called "zero-order" part.

The spatial light modulator 13 is controlled by a control unit 20. The control unit 20 applies a control signal to the controllable elements of the spatial light modulator 13 so as to control the modulated light beam 17 generated by said controllable elements. For example, the control unit 20 electrically controls the controllable elements of the spatial light modulator 13.

The control signal comprises an image signal component carrying data representative of the image to be projected.

The optical system 10 further comprises an objective lens assembly 21 arranged in an optical path of the modulated light beam 17 for projecting the image carried by the modulated part of the modulated light beam 17 into the replay volume 18.

As shown in FIG. 4, the objective lens assembly 21 is for example the combination of a telescope with a microscope objective. The objective lens assembly 21 includes a first lens 22 and a mirror 23 for reflecting the modulated light beam 17 towards a second lens 24 after passing through the first lens 22. The objective lens assembly 21 also includes a microscope objective 25 for projecting the image carried by the modulated part of the modulated light beam 17 into the replay volume 18.

As in the example pictured in FIG. 4, the optical system 10 can also comprise an optical arrangement 26 including a microscope objective 27, a tube lens 28 and a camera 29. The optical arrangement 26 is placed nearby the replay volume 18 for observing the light sensitive substance on a display connected to the camera 29.

As in the example illustrated in FIG. 4, the optical system 10 also comprises a perturbing aberrant optical element 30 for introducing aberrations in the incident light beam 12 and the modulated light beam 17.

The term 'aberrant' means a defect of the optical system which leads to the blurring of images. Aberrations are usually defined for imperfect imaging systems, and correspond that some rays do not converge to the image predicted by geometrical optics. In an imaging system with no aberration, the image of a point source is an image point with dimensions given by diffraction laws. In the presence of aberrations, the image of a point source is a spot larger than the afore-described image point. Usually, any optics like lenses or mirrors introduce a moderate amount of aberrations resulting in enlargement (or blurring) of the image point by a factor up to two or three, typically. If aberrations are large, the spot is so blurred in the replay volume—i.e. enlarged by a factor ten or more in the transverse direction—then, it is not possible to identify precisely an image point anywhere in the replay volume. Here, we may consider aberrations with such a large amplitude that the image of the unmodulated zero-order part of the modulated light beam 17 cannot be identified in the replay volume 18. Preferentially, aberrations should not be too large so that the spatial light modulator can efficiently correct for them.

After correction by the spatial light modulator the optical system presents a focal plane only for the modulated part of the modulated light beam, and not for the unmodulated "zero order" part.

The spatial light modulator does not shift away the image of the modulated part of the modulated light beam from the image of the unmodulated "zero order" part which does not exist as a bright spot in the replay volume anymore. In other words, the spatial light modulator does not introduce a lens effect.

The bright spot (or the image) of the unmodulated "zero order" part is blurred in the replay volume for forming a line, a plane or a volume, the image could be anywhere in the replay volume, and without polluting the modulated part, unlike it can be in the state of art.

This result may induce an energy loss in light energy of the modulated part less than or equal to 12%.

Figure 5:
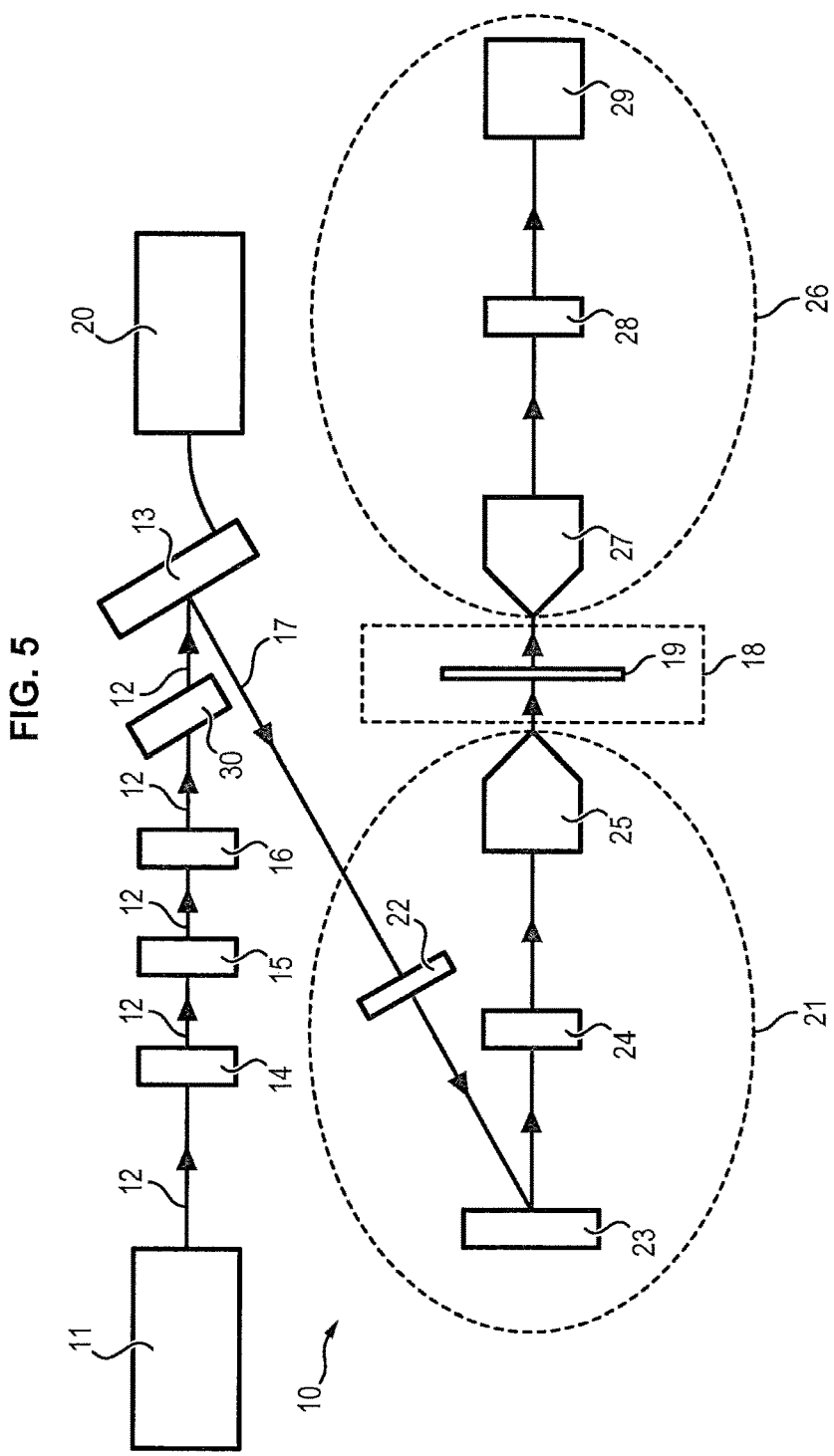
FIG. 5 is a schematic view of an optical system according to another embodiment of the invention.
Figure 6:
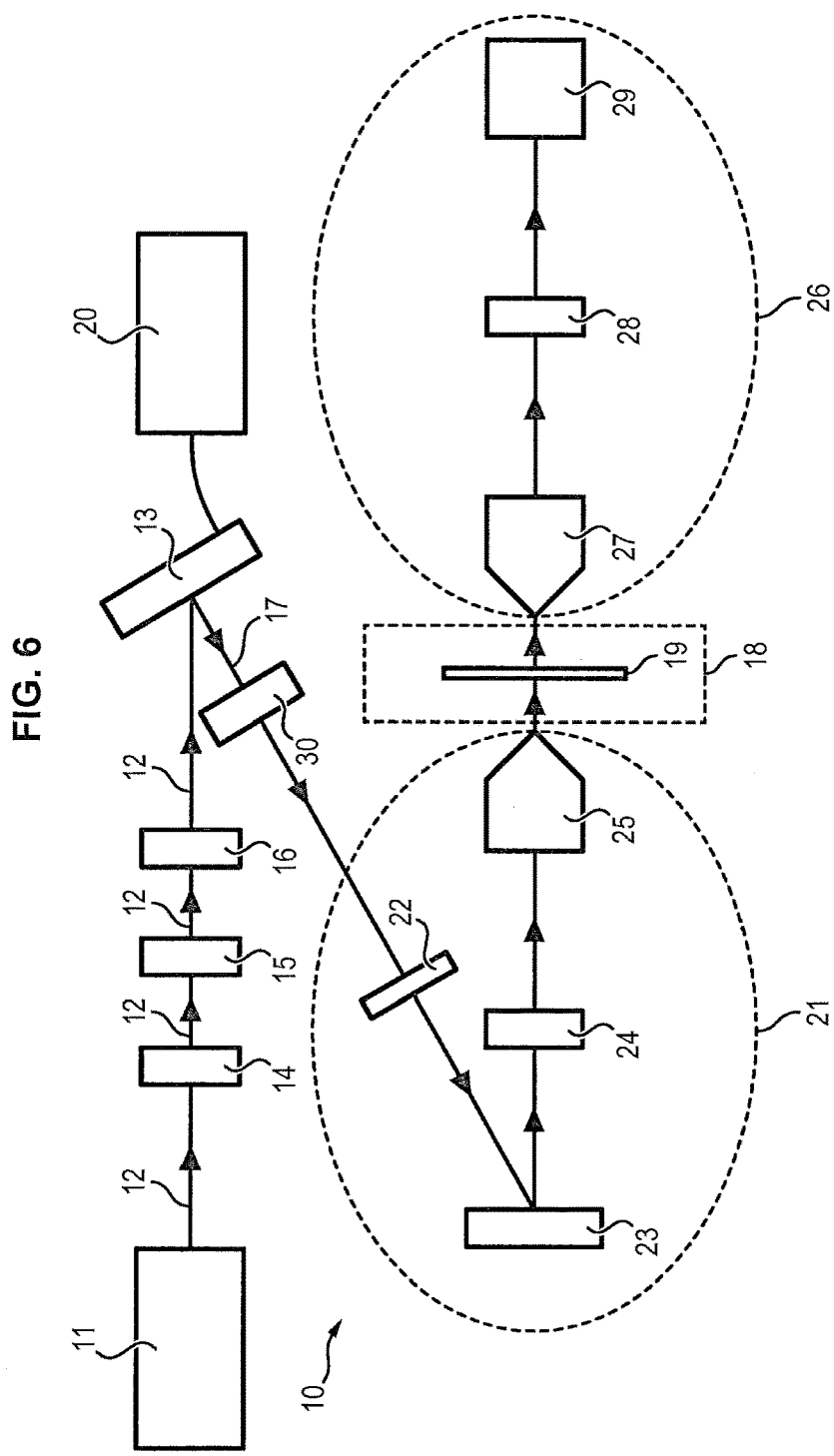
FIG. 6 is a schematic view of an optical system according to another embodiment of the invention.

The perturbing aberrant optical element 30 is arranged on the optical path of both the incident light beam 12 and the modulated light beam 17. According to another embodiment of the invention illustrated in FIG. 5, the perturbing optical element 30 is only arranged on the optical path of the incident light beam 12, and therefore only introduces aberrations in the incident light beam 12. According to another embodiment of the invention illustrated in FIG. 6, the perturbing optical element 30 is only arranged on the optical path of the modulated light beam 17, and therefore only introduces aberrations in the modulated light beam 17.

Aberrations here used may imprint a smooth wavefront distortion (without phase dislocations) to the modulated light beam 17 or wavefront distortions exhibiting spiral phases profiles or any phase singularities also known in the literature as screw dislocations and edge dislocations.

In other words, aberrations refer to aberrations that enlarge significantly an unmodulated beam in the replay volume.

The aberrations are predefined, which means that the aberrations are known before using the optical system (the properties of the aberrant optical system are known) and can be corrected by the spatial light modulator for the modulated light beam.

The perturbing aberrant optical element 30 spreads the energy distribution of the unmodulated "zero-order" part of the modulated light beam 17 in the replay volume 18. Preferably, aberrations should be large enough to spread the unmodulated "zero-order" part of the modulated light beam 17 in a volume of roughly the same dimensions as the replay volume but aberrations should not be too large in order to keep a reasonable fraction of light power in the three dimensional image.

Therefore, the optical system 10 does not introduce a blind-zone in the field of excitation as obtained with a beam-block and allow to display the three dimensional image in the whole replay volume 18 without being polluted by the unmodulated "zero-order" part of the modulated light beam 17. Alignment of the perturbing optical element 30 is also less critical than the alignment of a beam block and is not affected by possible laser pointing drifts. Furthermore, the optical system 10 does not result in a bright spot somewhere in the replay volume which may induce unwanted excitation of the biological sample by the unmodulated "zero-order" part and therefore artifacts in the obtained result as the method consisting in shifting the modulated part of the modulated light beam away from the unmodulated "zero-order".

Optical systems usually tend to minimize aberrations introduced in light beams, insofar as such aberrations degrade the projected image and may be critical depending on the application. As a result, the approach of the Applicant consisting of introducing aberrations in the incident light beam 12 and/or in the modulated light beam 17 goes totally against usual practices in the technical field of the invention. For this reason, the perturbing aberrant optical element 30 must be carefully adapted to the spatial light modulator 13 and the objective lens assembly 21.

The perturbing aberrant optical element 30 spreads the energy distribution of the unmodulated "zero order" part of the modulated light beam in the replay volume.

Figure 1:
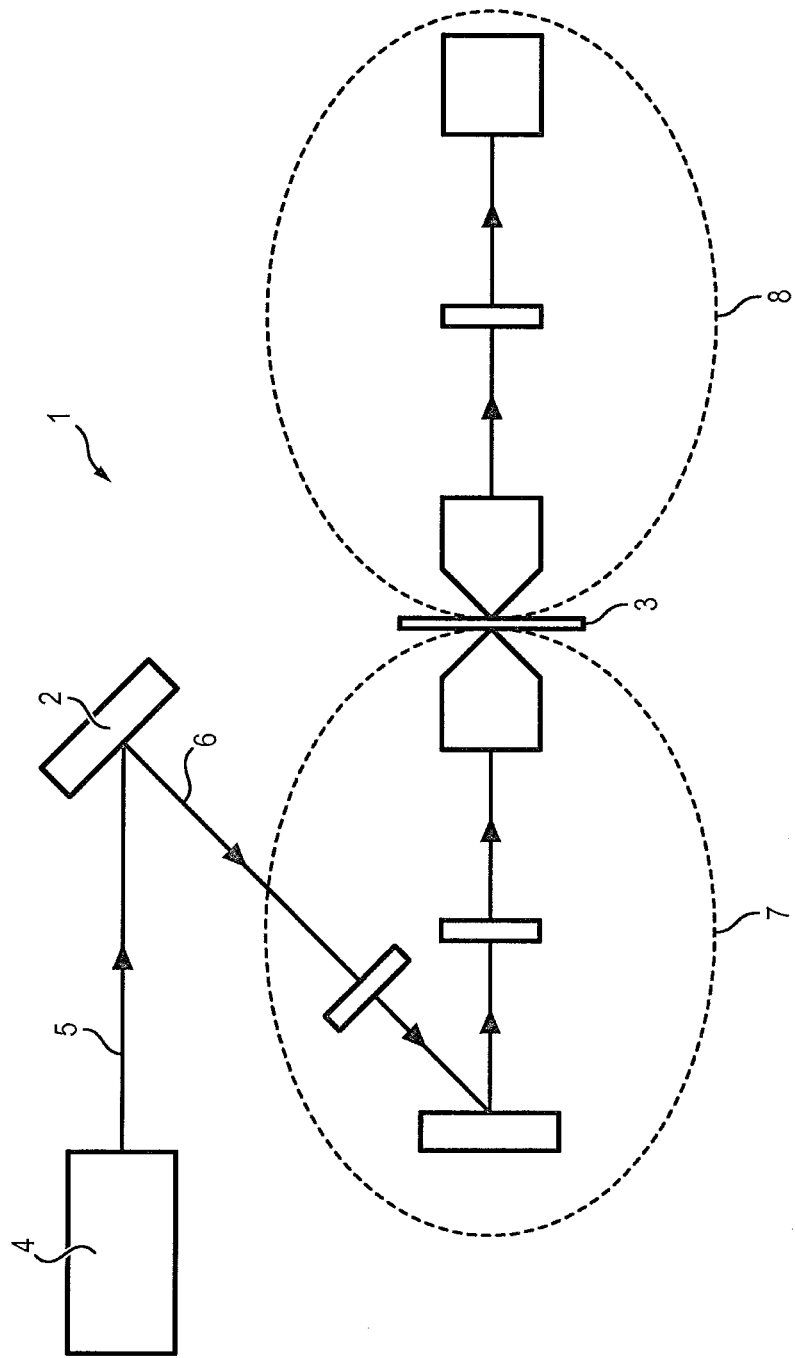
FIG. 1 (already described) is a schematic view of an optical system according to the state of the art.
Figure 3:
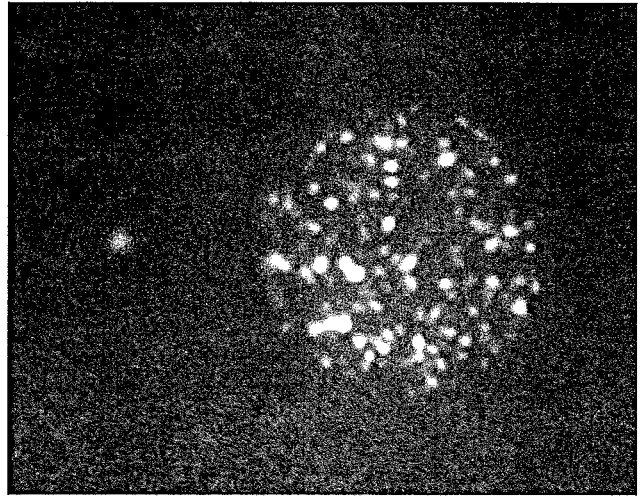
FIG. 3 (already described) is a picture of a fluorescent sample on which an image of a disk has been projected and wherein the unmodulated "zero-order" part has been shifted away from the region of interest of the sample.

Preferably, the perturbing optical element 30 spreads sufficiently the energy distribution of the zero-order part of the modulated light beam in the replay volume 18 so that a maximum intensity of the unmodulated "zero-order" part of the modulated light beam 17 in the replay volume 18 is less than a maximum intensity of the modulated part of said modulated light beam 17 in the replay volume 18. In FIG. 3, the maximum intensity of the unmodulated "zero-order" part of the modulated light beam 17 is slightly lower than the maximum light intensity of the modulated part. However, in FIG. 2, the maximum light intensity of the unmodulated "zero-order" part is much higher than the maximum intensity of the modulated part because the modulated part is spread over a larger surface than in FIG. 3. In principle, the modulated part can be spread over the full accessible field of view in the replay volume 18 whose surface is $0.25 \times N \times (\lambda/NA)^2$ where NA is the illumination numerical aperture, $\lambda$ the illumination wavelength and N the number of useful and illuminated controllable elements in the spatial light modulator while the unmodulated part is spread over a surface equal to $0.25 \times (\lambda/NA)^2$. Therefore, the surface of the modulated part may be N times larger than the surface of the unmodulated part. For typically 100 000 useful controllable elements and 1% of power of the modulated light beam 17 in the unmodulated part, the average intensity of a uniform image covering 1% of the accessible surface is theoretically 10 times lower than the maximum intensity of the unmodulated part. Preferably, the perturbing aberrant optical element should be chosen so that the maximum intensity of the unmodulated light beam is lower than the maximum intensity of the modulated light beam for an image covering 1% or more of the surface of the field of view, more preferably 10% or more of the surface of the field of view or even more preferably 50% or more of the surface of the field of view.

Inventors found that the perturbations introduced by existing spatial light modulators, which mainly consist in a lens effect, are unable to spreads sufficiently the zero-order part of the modulated light beam in the replay volume. They usually decrease by a factor 1.1 to 2 a maximum intensity of the unmodulated "zero order" part. Furthermore, the inventors found that, for a same power of the unmodulated "zero order" part of the modulated light beam 17 in the replay volume 18, decreasing a maximum intensity of the unmodulated "zero order" part of the modulated light beam 17 in the replay volume 18 by a factor ten or more allow the illumination of light sensitive substance without artifacts in the obtained result.

Hence, for a same power of the unmodulated "zero order" part of the modulated light beam 17 in the replay volume 18, the perturbing optical element 30 decreases by a factor five or more, preferably ten or more, more preferably twenty or more, even more preferably fifty or more, a maximum intensity of the unmodulated "zero order" part of the modulated light beam 17 in the replay volume 18.

Furthermore, for the same power of the unmodulated "zero-order" part of the modulated light beam 17 in the replay volume 18, the perturbing optical element decreases by a factor five or more, preferably ten or more, more preferably twenty or more, even more preferably fifty or more, a maximum excitation of the light sensitive substance by the unmodulated "zero-order" part of the modulated light beam 17.

In the particular implementation illustrated in FIG. 4, the spatial light modulator 13 is imaged at the back focal plane of the microscope objective 25 by the mean of a telescope made of first and second lenses 22 and 24. In the absence of perturbing optical element 30, the unmodulated "zero-order" part of the modulated light beam 17 results in a bright spot in the front focal plane of the microscope objective 25. The front focal plane usually lies in the replay volume 18. A size d of the "zero-order" spot in the front focal plane of the microscope objective 25 can be estimated as $d=0.5\lambda/NA$, where $\lambda$ is a wavelength of the modulated light beam 17 and NA is an illumination numerical aperture. An enlargement of the "zero-order" spot by a factor of M along both directions transverse to the optical axis reduces average intensity by a factor of $M^2$. The maximum intensity or the "zero-order" spot depends on speckle statistics and may be estimated numerically: the size and maximum intensity of the "zero-order" spot when the perturbing aberrant optical element 30 is arranged on the optical path of the incident light beam 12 and/or the modulated light beam 17 can be estimated numerically using light propagation laws. In particular, the relation between the electric field of the modulated light beam 17 at the back focal plane of the microscope objective 25 and the electric field in the front focal plane of the microscope objective 25 is a Fourier transform. The electric field in other planes of the replay volume 18 can be estimated by forward and backward Fresnel transforms from the front focal plane. The maximum intensity of the zero-order part in the replay volume 18 can thus be estimated numerically. The maximum intensity of the two or three dimensional image to be projected in the replay volume 18 may be estimated exactly the similar way by numerical computation. Therefore, depending on the typical images to be projected by the system, it is possible to choose or to engineer a perturbing aberrant optical element such that a maximum intensity of the unmodulated "zero order" part in the replay volume 18 is less than a maximum intensity of the modulated part in all the replay volume 18. The correcting signal to the spatial light modulator 13 must then be adapted to the chosen perturbing aberrant optical element. This signal may be determined by an a priori knowledge of the perturbing aberrant optical element or by an experimental correction procedure. The correcting signal is applied to the modulated part of the modulated light beam 17 but not to the unmodulated "zero-order" part.

Thus for a maximum intensity of the unmodulated "zero order" part in the replay volume inferior to a maximum intensity of the modulated part in all the replay volume 18, for instance tenth inferior, we have one first perturbing aberrant optical element, and for a maximum intensity of the unmodulated "zero order" part in the replay volume 18 inferior to a maximum intensity of the modulated part in all the replay volume 18, for instance fifteenth inferior, we have another second perturbing aberrant optical element.

Considering now a particular implementation wherein the perturbing aberrant optical element 30 is a cylindrical lens, the enlargement M is given approximately by $M=4\times NA^2\times G^2\times f^2\times V/\lambda$, where V is the vergence of the cylindrical lens, G the transverse magnification of the telescope including first and second lenses 22 and 24, and f the focal length of the microscope objective 25. Doing so, the "zero-order" spot is enlarged by a factor M along a single transverse direction and the maximum intensity of the zero-order is decreased by a factor M. In an experimental configuration with M=50 and a spatial light modulator 13 having 1 Mpx, we typically measured an energy loss of 12% in the three dimensional holographic image.

Figure 7:
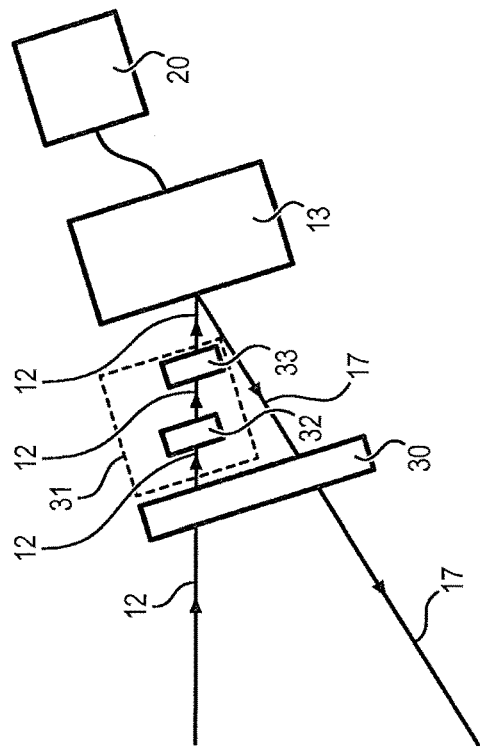
FIG. 7 is a schematic detailed view of an optical system according to another embodiment of the invention.

As illustrated in FIG. 7, the perturbing optical element 30 can be imaged on the spatial light modulator 13 by means of a telescope 31 including two lenses 32 and 33 that are arranged on the optical path of the incident light beam 12 between the perturbing optical element 30 and the spatial light modulator 13. This implementation allows the use of more elaborated perturbing optical elements 30 which can be specially designed to get a "zero-order" spot as large and uniform as possible thanks to an iterative Gerchberg-Saxton algorithm propagating back and forth the electric field between the back and the front focal plane of the microscope objective 25.

Figure 8:
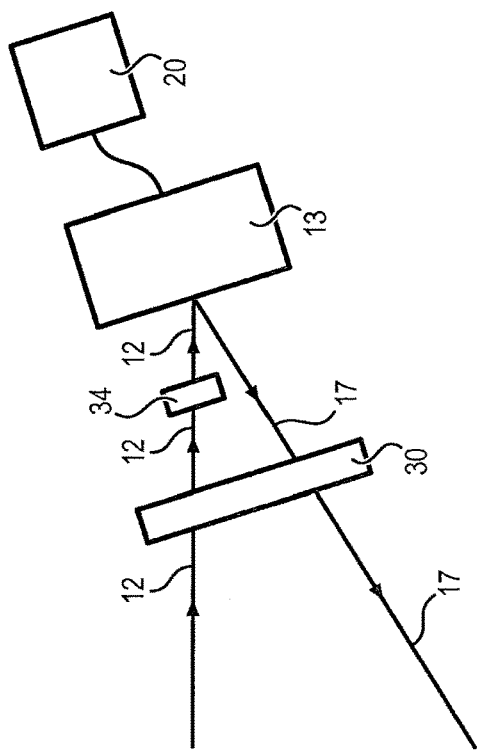
FIG. 8 is a schematic detailed view of an optical system according to another embodiment of the invention.

As illustrated in FIG. 8, the perturbing optical element 30 can also be imaged on the spatial light modulator 13 by means of a single lens 34 arranged on the optical path of the incident light beam 12 between the perturbing optical element 30 and the spatial light modulator 13.

In the replay volume 18, the maximum light intensity of the unmodulated "zero-order" part of the modulated light beam 17 and the light maximum intensity of the modulated part of the modulated light beam 17 can also be estimated and compared numerically, provided that the fraction of light power being modulated and remaining unmodulated are known. These fractions are characteristics related to diffraction efficiency of the spatial light modulator 13 and must be measured experimentally.

Experimentally, it is possible to measure the power and the intensity of the modulated part and the unmodulated "zero-order" part of the modulated light beam 17 on the camera 29. The intensity is proportional to $C/t\times g\times S$, where C is the number of counts measured by the camera 29, S the surface over which the number of counts C are collected, t the exposure time of the camera 29 and g the gain of the camera 29. The power is proportional to the intensity multiplied by S. Preferentially, for characterizing the perturbing aberrant optical element 30, the numerical aperture of the microscope objective 27 of the optical arrangement 26 is larger than or equal to the numerical aperture of the microscope objective 25 of the objective lens assembly 21. The power of the modulated light beam 17 is split into the image, the unmodulated "zero-order" part and some losses. The fraction of power in the image can be measured by dividing the power in the image by the power on the whole camera 29 when the spatial light modulator 13 is off. The fraction of power in the unmodulated "zero-order" part can be estimated the same way, by dividing the power of the unmodulated "zero-order" with the spatial light modulator 13 on by the power on the whole camera 29 when the spatial light modulator 13 is off.

In practical cases, it may be difficult to measure the power or the intensity of the unmodulated "zero-order" part of the modulated light beam 17 because they are very low or because the unmodulated "zero-order" part overlap with the modulated part. In this case, the fraction of power in the unmodulated "zero-order" part can be estimated following the previous procedure but without the perturbing optical element 30. In this case, the unmodulated "zero-order" part is focused into a sharp spot in the replay volume, providing much higher intensities and making overlap with the image negligible.

In some cases, it may be difficult to compare the maximum intensities with and without the perturbing optical element 30, for instance because the perturbing optical element 30 is integrated in the spatial light modulator 13. In this case, it is possible to estimate the loss in maximum intensity that is due to aberrations by measuring optical aberrations of the undiffracted "zero-order" part of the modulated light beam 17. Aberrations can be measured with a wave-front sensor like a Shack-Hartmann wave-front sensor. Aberrations may also be estimated by measuring the profile of the zero-order in different planes. In FIG. 3, the observed zero-order spot is very narrow and symmetric, suggesting that aberrations introduced by the spatial light modulator are weak.

If a light sensitive substance is used, the excitation of the light sensitive substance can also be measured on the camera 29, in particular when the light sensitive substance is a fluorescent dye. In this latter case, a dichroic filter, blocking the modulated light beam and letting fluorescence passing through, must be introduced between the light sensitive substance and the camera 29.

Aberrations also introduce distortions in the image to be projected. These distortions are corrected by the control signal applied by the control unit 20. For this purpose, the control signal further comprises a correction signal component representative of a correction pattern for correcting the distortions generated by the perturbing optical element 30 in the image to be projected.

The alternative solution consisting in shifting the modulated part of the modulated light beam away from the unmodulated "zero-order" part decreases the diffraction efficiency of the spatial light modulator due to the required modification of the image signal component of the control signal. Although spreading the unmodulated "zero-order" part of the modulated light beam 17 also requires an additional correction signal, the perturbing optical element 30 can be specially designed to induce a negligible loss in diffraction efficiency.

The optical system 10 introduced aberrations in the incident light beam 12 and/or the modulated light beam 17 in order to avoid that the unmodulated "zero-order" part of the modulated light beam 17 excites the light sensitive substance arranged in the support 19, while correcting the distortions generated by the aberrations in the image to be projected, so that the projected image is not degraded.

Figure 2:
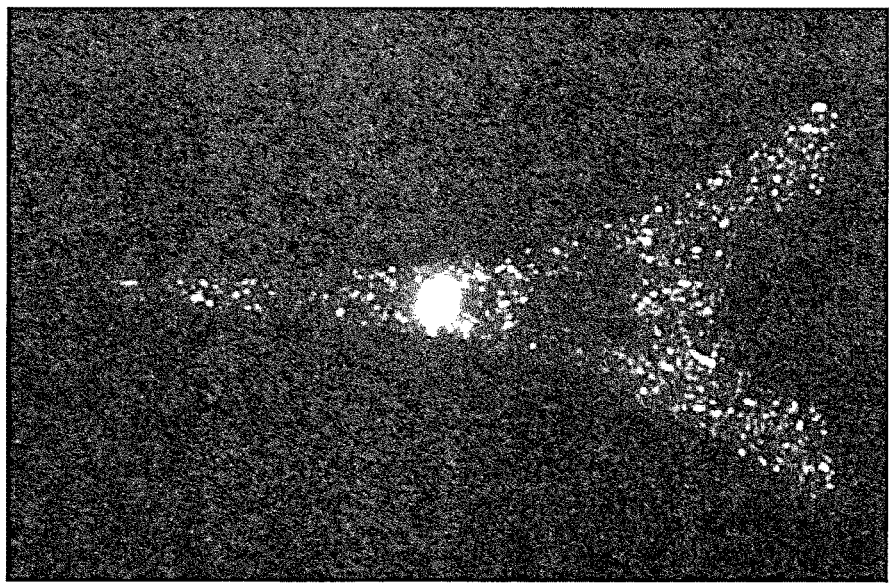
FIG. 2 (already described) is a picture of a fluorescent sample on which an image of the Eiffel tower has been projected using the optical system illustrated in FIG. 1.
Figure 9:
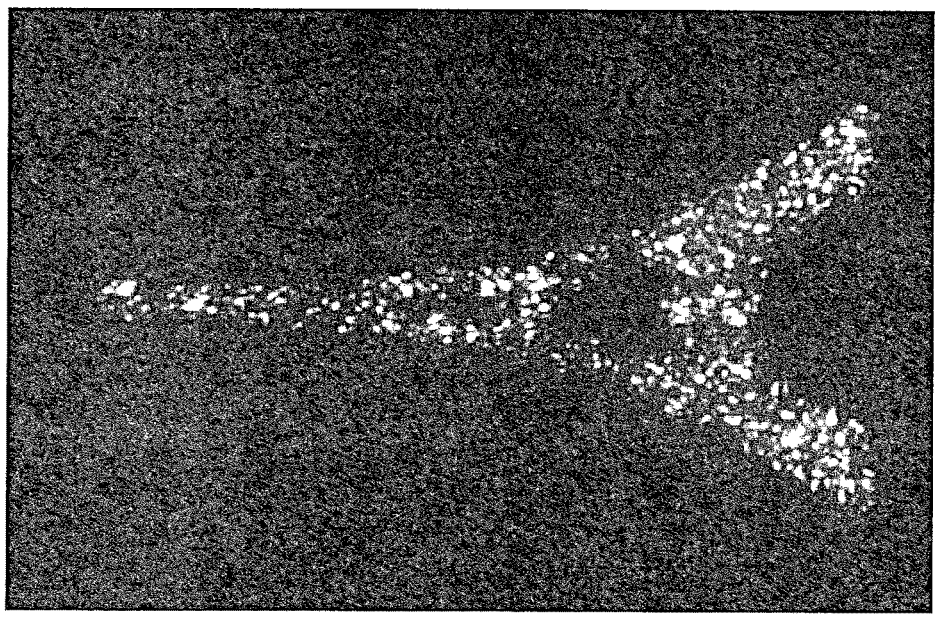
FIG. 9 is a picture of a fluorescent sample on which an image of the Eiffel tower has been projected using the optical system illustrated in FIG. 4.

FIG. 9 illustrates the improvements provided by the optical system 10 in comparison with FIG. 2. FIG. 9 shows that the tightly focused spot corresponding to the unmodulated "zero-order" part of the modulated light beam 17 has disappeared from the replay volume 18 in comparison with FIG. 2.

The perturbing aberrant optical element 30 is for example configured for spatially modulating a phase of the incident light beam 12 and/or the modulated light beam 17. Preferably, the correction signal component of the control signal required to correct the distortions introduced by the perturbing optical element 30, does not contain phase differences larger than 180° applied to adjacent controllable elements of the spatial light modulator 13. Preferably, the aberrations introduced by the perturbing optical element 30 have spatial frequencies at the level of the spatial light modulator 13 that are less than or equal to 1/(2a), where a is a period of the array of controllable elements. Depending on the relative position of the perturbing optical element 30 and the spatial light modulator 13, spatial frequencies of the perturbing optical element 30 can be determined at the level of the spatial light modulator 13 using light propagation laws. Indeed, any larger spatial frequency of the aberrations generated by the perturbing optical element 30 could not be balanced by the spatial light modulator 13. A spatial frequency is defined as a characteristic of any structure that is periodic across position in space. The spatial frequency is a measure of how often sinusoidal components as determined by the Fourier transform of the structure repeat per unit of distance.

According to one embodiment of the invention, the perturbing aberrant optical element 30 comprises a lens having a cylindrical surface for spreading the incident light beam 12 and the modulated light beam 17 to a spreading direction. The perturbing aberrant optical element 30 is for example a cylindrical lens. If the unmodulated "zero-order" part results in a bright spot in the replay volume 18 without a perturbing optical element 30, the cylindrical lens 30 would then change the spot into two cross oriented lines along the cylindrical lens axes having intensities lower than the initial bright spot, one line lying in the same transverse plane as the initial bright spot, and the other line lying in a distant transverse plane. The distance between the two planes as well as the size of the lines is proportional to the vergence V, of the cylindrical lens 30.

According to another embodiment of the invention, the perturbing aberrant optical element 30 comprises a first lens having a first cylindrical surface and a second lens having a second cylindrical surface for spreading the incident light beam 12 and/or the modulated light beam 17 according to a first spreading direction and to a second spreading direction defining an angle relative to the first spreading direction. The perturbing optical element 30 comprises for example a first and a second cylindrical lens whose axes are 90° oriented. If the unmodulated "zero-order" part results in a bright spot in the replay volume 18 without any perturbing optical element 30, the two cylindrical lenses 30 would then change the spot into two cross oriented lines along the cylindrical lens axes having intensities lower than the initial bright spot, the two lines lying in planes different from the plane where the initial bright spot was. The distance between the two lines and the initial bright spot is proportional to the vergences of the two cylindrical lenses. The distance between the two lines as well as the size of the lines is proportional to the difference between the two vergences. The bright spot is enlarged along the two dimensions in the plane of the initial spot. The two vergences must therefore be different; otherwise, the initial bright spot contains no aberrations, it is simply shifted axially and is not spread.

According to another embodiment of the invention, the perturbing aberrant optical element 30 comprises a spatial light modulator.

For example, in the case of perturbing aberrant optical element 30 comprising one or two cylindrical lenses, the aberrations that are generated by the perturbing optical element 30 are a priori known. The correction signal component of the control signal can therefore be calculated accordingly.

On the contrary, when the perturbing optical element 30 generates aberrations that are not a priori known, the correction signal component needs to be set. The correction signal component can for example be determined using adaptive optics algorithms and describing aberrations with Zernike polynomials whose coefficients can be adjusted more accurately in real-time.

According to another embodiment of the invention, the perturbing aberrant optical element 30 is integrated in the spatial light modulator 13.

Figure 10:
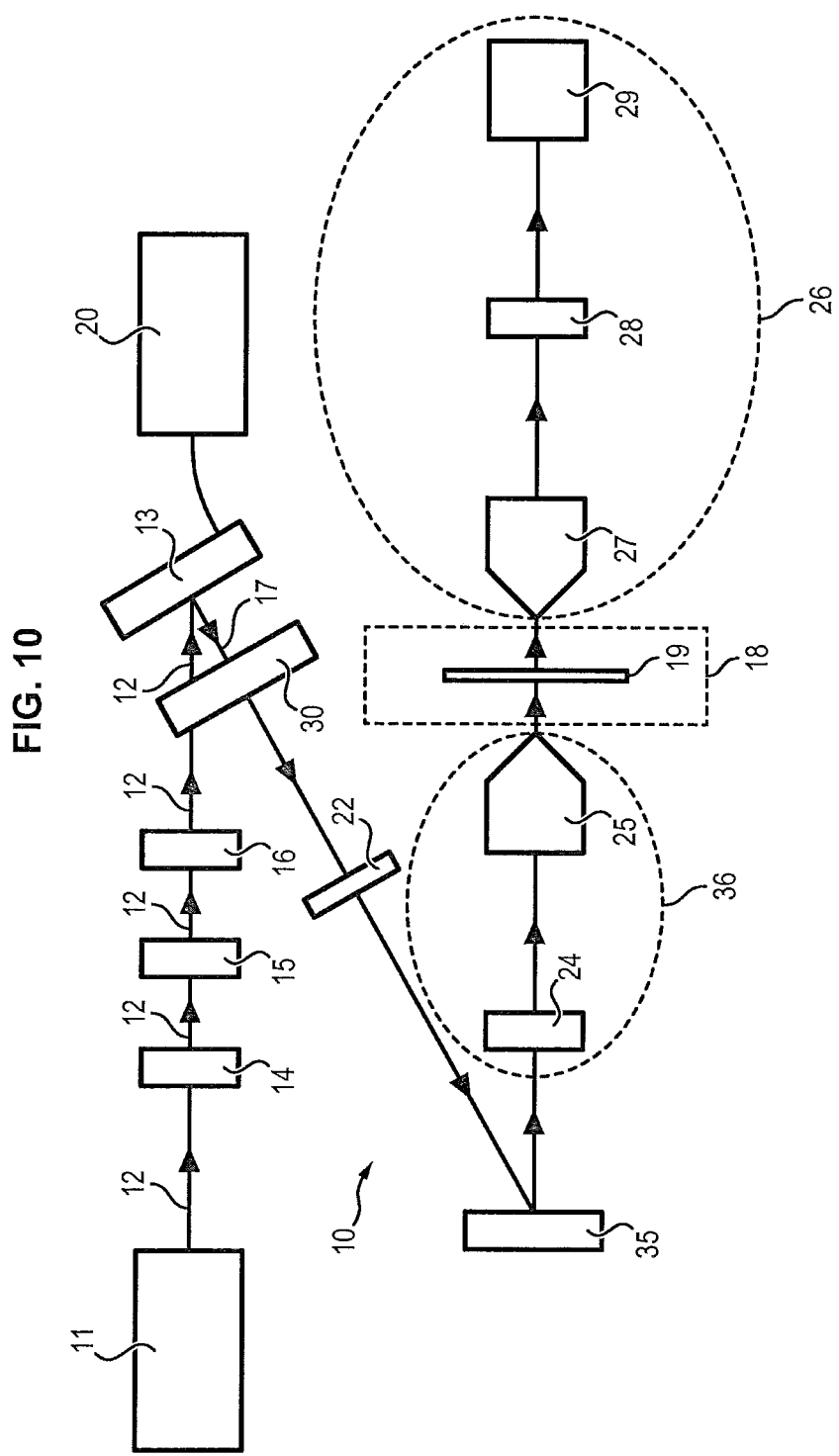
FIG. 10 is a schematic view of an optical system according to another embodiment of the invention.

In another embodiment illustrated in FIG. 10, the mirror 23 of the objective lens assembly 21 is replaced by a dispersive optical element 35 for pulse stretching the modulated light beam 17, and the second lens 24 and the microscope objective 25 together form an optical arrangement 36 for pulse compressing the stretched modulated light beam into the replay volume 18 This configuration, known in the literature as "temporal focusing" allows improved optical sectioning in the case of two-photon excitation induced by an extended-shaped pulsed beam on a light sensitive substance located in the replay volume, in comparison to optical sectioning achieved in this case by simple spatial focusing. When two cylindrical lenses are used as a perturbing optical element 30, the two lines do not lie in the temporal focusing plane where the excitation occurs. Excitation by the lines is therefore suppressed.

Figure 11:
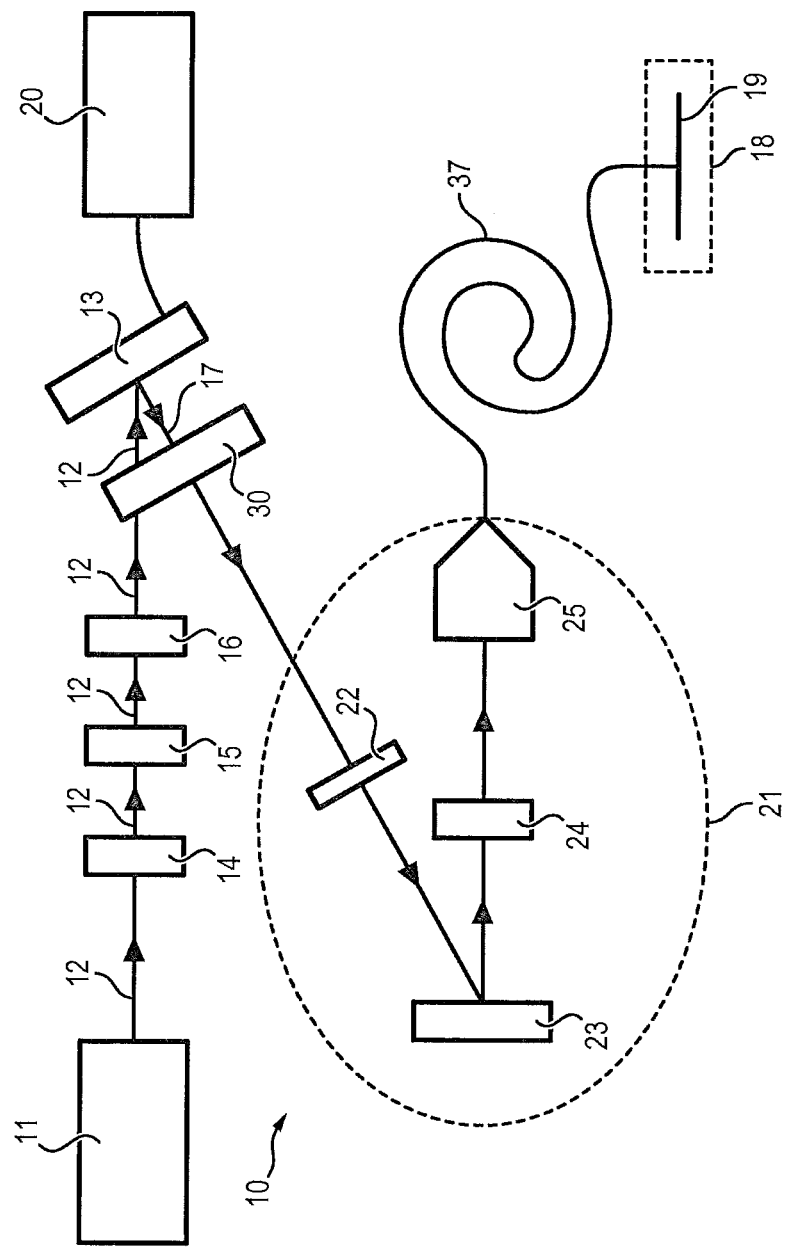
FIG. 11 is a schematic view of an optical system according to another embodiment of the invention.

As illustrated in FIG. 11, the optical system 10 can comprise an optical fiber or an optical fiber bundle 37 for projecting the image in the replay volume 18. This implementation allows photo-excitation in micro-endoscopic systems.

Figure 12:
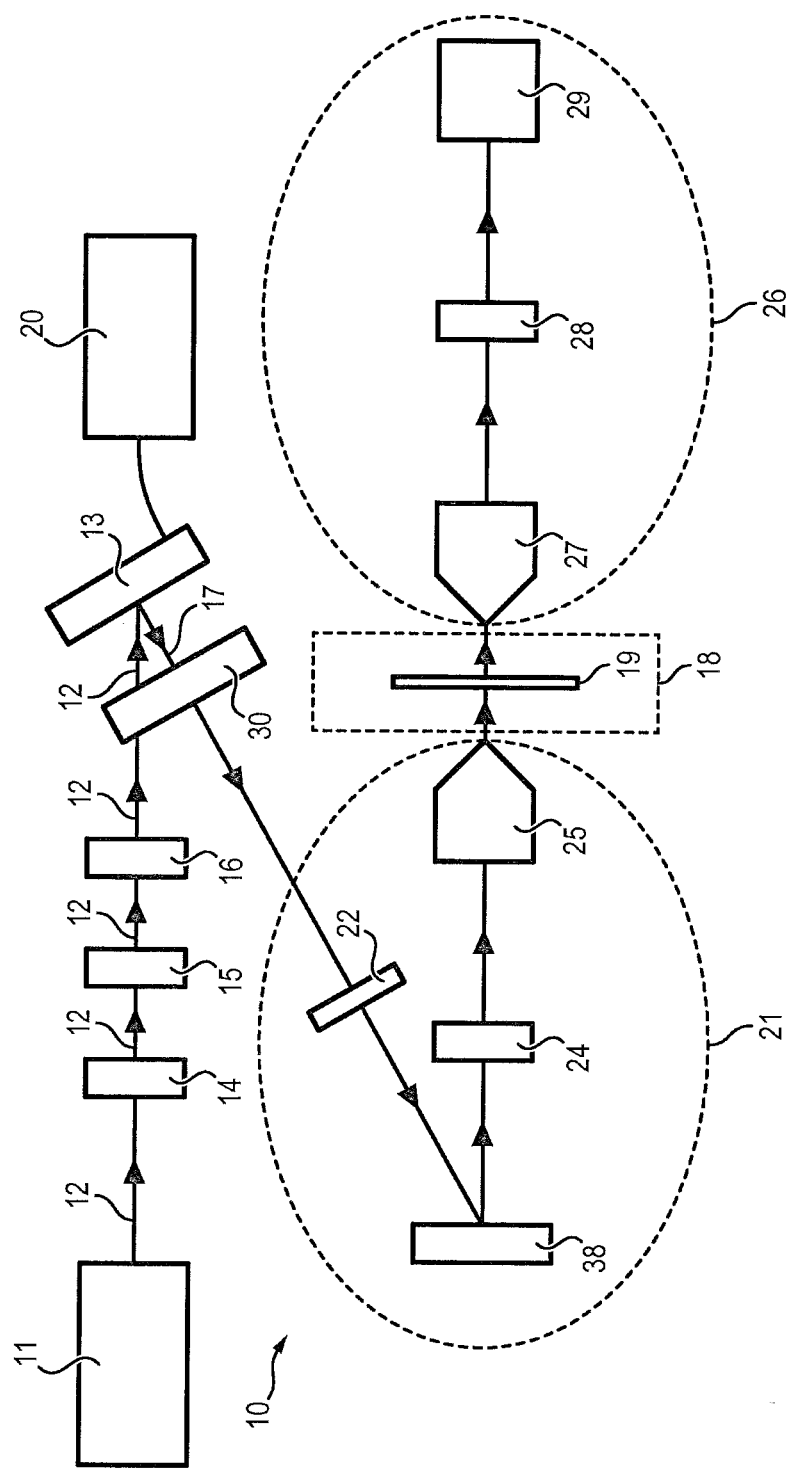
FIG. 12 is a schematic view of an optical system according to another embodiment of the invention.

As illustrated in FIG. 12, the optical system 10 can comprise an amplitude modulator 38 arranged between the spatial light modulator 13 and the light sensitive substance for modulating an amplitude of the modulated light beam 17. The amplitude modulator 38 replaces for example the mirror 23 of the objective lens assembly 21, and is therefore arranged on the optical path of the modulated light beam 17 between first and second lenses 22, 24. Preferably, the amplitude modulator 38 increases an excitation speed of the light sensitive substance. In the case the spatial light modulator 13 is a phase modulator for which phase is modulated by tilting nematic liquid crystals in the controllable elements, its response time is larger or equal than 1 ms, typically 10 ms, and its refreshing rate less than 250 Hz, typically 60 Hz. The combination with an amplitude modulator 38 made of digital micro-mirrors can access refreshing rates of tens of kilohertz and response times of the order of microsecond. This combination allows high speed excitation modulation of the sample.

The invention claimed is:

1. An optical system (10) comprising:
    a light emitting source (11) for generating an incident light beam (12);
    a first spatial light modulator (13) comprising an array of controllable elements adapted for generating a modulated light beam (17) by diffracting the incident light beam (12), the modulated light beam (17) comprising a modulated part and an unmodulated "zero order" part, the modulated part carrying an image to be projected into a replay volume (18);
    a control unit (20) for applying a control signal to the controllable elements so as to control the modulated light beam (17) generated by the controllable elements, wherein the optical system (10) further comprises a perturbing aberrant optical element (30) for introducing optical aberrations in the incident light beam (12) and/or the modulated light beam (17), so as to spread the unmodulated "zero order" part of the modulated light beam (17) in the replay volume (18) where the image carried by the modulated part is projected, with a maximum intensity of the unmodulated "zero order" part in the replay volume (18) being less than a maximum intensity of the modulated part in all the replay volume (18) where the image carried by the modulated part is projected, wherein the perturbing aberrant optical element (30) generates distortions in the image carried by the modulated part to be projected; and
    a second spatial light modulator, or
    at least one cylindrical lens having a cylindrical surface, for spreading the incident light beam (12) and/or the modulated light beam (17) according to a spreading direction, wherein the control signal comprises an image signal component carrying data representative of the image to be projected and a correction signal component representative of a correction pattern for correcting the distortions generated by the perturbing aberrant optical element (30) in the image carried by the modulated part to be projected, the optical system presenting a focal plane only for the modulated part of the modulated light beam, and not for the unmodulated "zero order" part, after correction by the first spatial light modulator (13).

2. The optical system according to claim 1, wherein, for a same power of the unmodulated "zero order" part in the replay volume, the perturbing aberrant optical element (30) decreases, by a factor ten or more, a maximum intensity of the unmodulated "zero order" part of the modulated light beam (17) in the replay volume (18).

3. The optical system according to claim 1, further comprising a support (19) for receiving a sample, and an objective lens assembly (21) comprising an objective lens (25) and additional lenses (22, 24) for projecting the image into the sample, wherein: typical dimensions $\Delta X$, $\Delta Y$ and $\Delta Z$ of the replay volume are $\Delta X = \Delta Y = \lambda \times f_1 \times f_{obj}/(a \times f_2)$ for dimensions transverse to an optical axis of the objective lens and the additional lenses and $\Delta Z = \lambda \times f_1 \times f_{obj}/(2 \times NA \times a \times f_2)$ the dimension along the optical axis, where $f_1$ and $f_2$ are the focal lengths of the additional lenses (22, 24) situated downstream from the perturbing aberrant optical element (30), $f_{obj}$ is the focal length of the objective lens (25) situated downstream from the additional lenses (22, 24), NA is the numerical aperture of the objective lens (25), and a is the typical size of phase actuators of the first spatial light modulator (13).

4. The optical system according to claim 3, wherein the aberrations introduced by the perturbing aberrant optical element (30) have spatial frequencies that are less than or equal to 1/(2a), where a is a period of the array of controllable elements.

5. The optical system according to claim 1, wherein the first spatial light modulator (13) is a spatial phase modulator.

6. The optical system according to claim 1, wherein the perturbing aberrant optical element (30) comprises a first cylindrical lens having a first cylindrical surface and a second cylindrical lens having a second cylindrical surface, for spreading the incident light beam (12) and/or the modulated light beam (17) according to a first spreading direction and to a second spreading direction defining an angle relative to the first spreading direction.

7. The optical system according to claim 1, further comprising a support (19) and a light sensitive substance located in the replay volume (18) in the support (19), wherein:
    the modulated part carries the image to be projected into the replay volume (18) for exciting the light sensitive substance, and
    the light sensitive substance exhibits a non-linear optical response and is only excited by the modulated part of the modulated light beam (17).

8. The optical system according to claim 1, further comprising a dispersive optical element (35) for pulse stretching the modulated light beam, and an optical arrangement (36) for pulse compressing the stretched modulated light beam in the replay volume (18).

9. The optical system according to claim 1, further comprising an optical fiber or an optical fiber bundle (37), wherein the image is projected in the replay volume (18) through the optical fiber or optical fiber bundle.

10. The optical system according to claim 1, further comprising an amplitude modulator (38) arranged between the first spatial light modulator (13) and a sensitive substance, the amplitude light modulator modulating an amplitude of the modulated light beam, preferably increasing a modulation speed.

11. Method for spreading an unmodulated "zero-order" part of a modulated light beam (17) generated by a first spatial light modulator (13) with the optical system defined in claim 1, comprising the steps of:
  a) generating an incident light beam (12);
  b) diffracting the incident light beam (12) by means of the spatial light modulator (13); and
  c) generating the modulated light beam (17) by applying a control signal to controllable elements of the first spatial light modulator (13), the control signal comprising an image signal component carrying data representative of an image to be projected, the modulated light beam (17) comprising a modulated part and the unmodulated "zero-order" part, the modulated part carrying the image to be projected into a replay volume (18);
  wherein optical aberrations are introduced in the incident light beam (12) and/or the modulated light beam (17) by means of a perturbing aberrant optical element (30) so as to spread the unmodulated "zero-order" part of the modulated light beam in the replay volume (18) where the image is projected, with a maximum intensity of the unmodulated "zero order" part in the replay volume (18) being less than a maximum intensity of the modulated part in all the replay volume (18);
  the perturbing aberrant optical element generating distortions in the image carried by the modulated part to be projected, and comprising:
    a second spatial light modulator, or
    at least one cylindrical lens having a cylindrical surface, for spreading the incident light beam and/or the modulated light beam according to a spreading direction,
  distortions generated by the perturbing aberrant optical element (30) in the image to be projected are corrected by applying to the controllable elements a correction signal component of the control signal representative of a correction pattern, the optical system presenting a focal plane only for the modulated part of the modulated light beam, and not for the unmodulated "zero order" part, after correction by the first spatial light modulator (13).

12. Method according to claim 11, wherein the perturbing aberrant optical element (30) comprises a first cylindrical lens having and a second cylindrical lens, and the spatial light modulator does not shift away the image of the modulated part of the modulated light beam from the image of the unmodulated "zero order" part.

13. Method according to claim 11, wherein the modulated part carries the image to be projected into the replay volume (18) for exciting a light sensitive substance located in the replay volume (18) in a support (19).

14. Method according to claim 11, wherein:
  the modulated part carries the image to be projected into the replay volume (18) for exciting a light sensitive substance located in the replay volume (18), and
  the light sensitive substance is a fluorescent material which exhibits a non-linear optical response and being only excited by the modulated part of the modulated light beam (17).

15. The optical system according to claim 14, wherein the first cylindrical lens and the second cylindrical lens having different vergences, the first spatial light modulator (13) does not shift away the image of the modulated part of the modulated light beam from the image of the unmodulated "zero order" part.

16. Method according to claim 11, wherein, for a same power of the unmodulated "zero order" part in the replay volume, the perturbing aberrant optical element (30) decreases, by a factor ten or more, a maximum intensity of the unmodulated "zero order" part of the modulated light beam (17) in the replay volume (18).

17. Method according to claim 11, wherein the optical system comprises a support (19) for receiving a sample, and an objective lens assembly (21) comprising an objective lens (25) and additional lenses (22, 24) for projecting the image into the sample, wherein typical dimensions $\Delta X$, $\Delta Y$ and $\Delta Z$ of the replay volume are $\Delta X = \Delta Y = \lambda f\_1 \, f\_obj/(a f\_2)$ for dimensions transverse to an optical axis of the objective lens and the additional lenses and $\Delta Z = (\lambda f\_1 \, f\_obj)/((2 \times NA \times a f\_2))$ for the dimension along the optical axis, where: $f\_1$ and $f\_2$ are the focal lengths of the additional lenses (22, 24) situated downstream from the perturbing aberrant optical element (30), $f\_obj$ is the focal length of the objective lens (25) situated downstream from the additional lenses (22, 24), NA is the numerical aperture of the objective lens (25) and a is the typical size of phase actuators of the first spatial light modulator (13).

* * * * *